(12) United States Patent
Luckcuck et al.

(10) Patent No.: US 12,324,412 B2
(45) Date of Patent: Jun. 10, 2025

(54) CONFIGURABLE LABYRINTH FOR AN ANIMAL

(71) Applicants: Julie Luckcuck, Suisun City, CA (US); Paul Luckcuck, Suisun City, CA (US)

(72) Inventors: Julie Luckcuck, Suisun City, CA (US); Paul Luckcuck, Suisun City, CA (US)

( * ) Notice: Subject to any disclaimer, the term of this patent is extended or adjusted under 35 U.S.C. 154(b) by 24 days.

(21) Appl. No.: 18/167,911

(22) Filed: Feb. 13, 2023

(65) Prior Publication Data
US 2024/0268337 A1 Aug. 15, 2024

(51) Int. Cl.
*A01K 1/00* (2006.01)
*A01K 1/035* (2006.01)

(52) U.S. Cl.
CPC .................................. *A01K 1/035* (2013.01)

(58) Field of Classification Search
CPC ........ A01K 15/02; A01K 1/031; A01K 29/00; E04H 1/1205; E04H 1/12; A63H 33/10; A63H 33/105; A63H 33/08; A63H 33/084; A63H 18/02; A47B 96/1466; A47B 96/1416; A47B 2096/1491; E04B 2/7433; E04B 2/766; F16B 2200/30; F16B 12/46; F16B 5/0052; B27F 1/00; B27F 1/08
See application file for complete search history.

(56) References Cited

U.S. PATENT DOCUMENTS

| | | | | | |
|---|---|---|---|---|---|
| 2,283,574 | A | * | 5/1942 | Pillsbury | E04B 1/6108 52/464 |
| 3,857,364 | A | * | 12/1974 | Miller, Jr. | A01K 15/02 119/417 |
| 4,953,502 | A | * | 9/1990 | Hoover | A01K 15/025 273/153 R |
| 5,470,139 | A | * | 11/1995 | Hsiao | A47F 3/12 312/138.1 |
| 5,647,181 | A | * | 7/1997 | Hunts | A63H 33/10 312/265.5 |
| 2002/0125634 | A1 | * | 9/2002 | Roy | A63J 11/00 273/153 R |

* cited by examiner

*Primary Examiner* — Richard T Price, Jr.
(74) *Attorney, Agent, or Firm* — Dana Legal Services; Jubin Dana

(57) ABSTRACT

A configurable labyrinth for an animal is stackable and has a support structure with a vertical column. A first connector is configured to connect to the first end of the vertical column. A second connector is configured to connect to the second end of the vertical column. A first horizontal platform support is configured to connect to the first connector and is configured to retain at least a portion of the first plate. A second horizontal platform support is configured to connect to the second connector and is configured to retain at least a portion of the second plate. A removable panel is configured to slidable traverse the track of the vertical column of the support structure, whereby at least a portion of an edge of the removable panel is retained in the track of the second horizontal platform support.

10 Claims, 24 Drawing Sheets

1000

1000

1100

1100

1400

1400

1400

1500

1500

1500

1700

1700

1700

2000

2000

2200

2200

2200

2300

2300

2300

2400

2400

CONFIGURABLE LABYRINTH FOR AN ANIMAL

FIELD OF THE INVENTION

The present invention pertains generally to the field of training or exercise equipment and, more particularly, to the field of mazes or labyrinths for animals.

BACKGROUND

Small pets such as cats and ferrets require exercise and intellectual stimulation. It is currently known for pets to struggle with boredom, which may lead to inactivity. As a result of this inactivity, health issues may arise including, but not limited to lethargy and/or obesity. Thus, it would be more desirable for a pet custodian such as an owner, a foster, and/or a veterinarian to provide exercise and an interesting activity to a pet within a confined space such as in an apartment, a house, a pet store, and/or a boarding facility.

In today's market, there are individual pet toys and structures that are permanent in shape and function. While a pet may initially enjoy learning each new toy and/or structure, the pet may soon lose interest and motivation to further explore the object. Thus, there is a need to maintain a pet's attention to a pet toy having removable and/or interchangeable components that allow a pet to enjoy a differing configuration.

However, in view of the prior art considered as a whole at the time the present invention was made; it was not obvious to those of ordinary skill in the pertinent art how the identified needs could be fulfilled.

SUMMARY OF THE INVENTION

In accordance with the principles of the present invention, an exercise structure for a pet having an interchangeable maze configuration and which also includes improvements that overcome the limitations of prior pet training or exercising equipment, is now met by a new, useful, and non-obvious invention.

A kit with a combination of slotted rails, corner blocks, and flat panels may be assembled into a plurality of interconnected boxes forming a three-dimensional maze for a pet to explore. Rectangular box units have standard dimensions that allow additional units to interconnect in the same or perpendicular directions. Interchangeable panels may be solid color, opaque, and/or translucent to allow light and observation. The panels are configured to slidably traverse a track in the frame of the box unit. Some and/or all panels may have holes and/or hatches allowing horizontal and vertical movement between the units. All panels fit in a way that makes them easily removable and interchangeable. Both the boxes and panels may be changed to allow the maze to be easily reconfigured. The individual boxes may be stacked and are joined at the corners in an X and/or a Y dimension to give depth and/or height to the maze structure. This disclosure presents new pet maze structure for a pet to explore without an individual having to buy a replacement toy each time their pet gets bored. These and further benefits and features of the present invention will now be described in detail with reference to exemplary embodiments in accordance with the invention.

The boxes may be removable and stackable to allow for new configurations. The panels of the boxes may be oriented to allow a pet to traverse the maze to access a pet item including, but not limited to, a litter box, a food item, a treat, and/or a toy, encouraging the pet to explore and exercise.

The panels may have openings of differing sizes arranged to form a pathway of a maze that is arranged to restrict access to designated areas of the maze. For example, some boxes may retain items for storage of, for example, pet supplies and/or may retain items for display, and are not accessible to a pet.

It is within the scope of this invention for different pet related items and/or objects including, but not limited to, toys and/or treats to be located on panels and in the removable box units throughout the maze.

It is within the scope of this invention for a user to arrange the boxed units of the maze to look like furniture. For example, the maze may be arranged around open spaces that form, for example, shelves for books. The combination of pet accessible areas and pet restricted areas is possible with removable panels. The removable panels of the maze allow for an individual to access compartments for easy cleaning, easy placement of food, easy access of a litterbox, and easy rearrangement of the pathways.

It is within the scope of this invention for any individual such as, including but not limited to, an individual with a mobility issue to have the removable box units stacked to a height, to orient a pet item such as, a food dish, a water bowl, and/or a litter box to be easily accessible. For example, an individual confined to a wheelchair may not be able to access a litterbox on the ground and may be able to more easily access the litterbox if it was raised up from the floor to a more desirable height. A litter box may be retained within a stacked box unit and a panel may conceal the contents of the box unit, while the pet may have access to the litterbox with a panel having an opening or a pathway not having a removable panel.

In some aspects, the techniques described herein relate to a configurable labyrinth for an animal, including: a first plate; a second plate; a support structure including: a vertical column, the vertical column having a first end having a first opening located opposite a second end having a second opening, the vertical column having a track; a first connector, the first connector having at least one pin extending therefrom, the at least one pin of the first connector is configured to be retained by the first opening of the first end of the vertical column; a second connector, the second connector having at least one pin extending therefrom, the at least one pin of the second connector is configured to be retained by the second opening of the second end of the vertical column; a first horizontal platform support having a first end with a first opening located opposite a second end having a second opening, the first opening of the first end of the first horizontal platform support is configured to receive a pin of the at least one pin of the first connector, the first horizontal platform support having at least one step, the at least one step is configured to retain at least a portion of the first plate; and a second horizontal platform support having a first end with a first opening located opposite a second end having a second opening, the first opening of the first end of the second horizontal platform support is configured to receive a pin of the at least one pin of the second connector, the second horizontal platform support having at least one step, the at least one step is configured to retain at least a portion of the second plate, the second horizontal platform support having a track; and a removable panel, the removable panel having a protruding structure configured to slidable traverse the track of the vertical column of the support structure, whereby at least a portion of an edge of the removable panel is retained in the track of the second horizontal platform support.

In some aspects, the techniques described herein relate to a configurable labyrinth for an animal wherein the vertical column having a radiused guide structure, the radiused guide structure is located on an end portion of the track, the radiused guide structure is splayed, the radiused guide structure is configured to guide the protruding structure of the removable panel into the track of the vertical column during installation.

In some aspects, the techniques described herein relate to a configurable labyrinth for an animal wherein the end portion of the radiused guide structure is notched, whereby, the end portion of the radiused guide structure does not contact the vertical column.

In some aspects, the techniques described herein relate to a configurable labyrinth for an animal wherein the removable panel having at least one opening.

In some aspects, the techniques described herein relate to a configurable labyrinth for an animal wherein the removable panel having a hingedly pivotable door.

In some aspects, the techniques described herein relate to a configurable labyrinth for an animal, including: a first plate; a second plate; a support structure including: a vertical column, the vertical column having a first end having a first opening located opposite a second end having a second opening, the vertical column having a track; a first connector, the first connector is configured to connect to the first end of the vertical column; a second connector, the second connector is configured to connect to the second end of the vertical column; a first horizontal platform support is configured to connect to the first connector, the first horizontal platform support is configured to retain at least a portion of the first plate; and a second horizontal platform support is configured to connect to the second connector, the second horizontal platform support is configured to retain at least a portion of the second plate, the second horizontal platform support having a track; and a removable panel, the removable panel is configured to slidable traverse the track of the vertical column of the support structure, whereby at least a portion of an edge of the removable panel is retained in the track of the second horizontal platform support.

In some aspects, the techniques described herein relate to a configurable labyrinth for an animal wherein the vertical column having a radiused guide structure, the radiused guide structure is located on an end portion of the track, the radiused guide structure is splayed, the radiused guide structure is configured to guide a protruding structure of the removable panel into the track of the vertical column during installation.

In some aspects, the techniques described herein relate to a configurable labyrinth for an animal wherein the end portion of the radiused guide structure is notched, whereby, the end portion of the radiused guide structure does not contact the vertical column.

In some aspects, the techniques described herein relate to a configurable labyrinth for an animal wherein the removable panel having at least one opening.

In some aspects, the techniques described herein relate to a configurable labyrinth for an animal wherein the removable panel having a hingedly pivotable door.

Clause 1. A configurable labyrinth for an animal, comprising: a first plate; a second plate; a support structure comprising: a vertical column, the vertical column having a first end having a first opening located opposite a second end having a second opening, the vertical column having a track; a first connector, the first connector having at least one pin extending therefrom, the at least one pin of the first connector is configured to be retained by the first opening of the first end of the vertical column; a second connector, the second connector having at least one pin extending therefrom, the at least one pin of the second connector is configured to be retained by the second opening of the second end of the vertical column; a first horizontal platform support having a first end with a first opening located opposite a second end having a second opening, the first opening of the first end of the first horizontal platform support is configured to receive a pin of the at least one pin of the first connector, the first horizontal platform support having at least one step, the at least one step is configured to retain at least a portion of the first plate; and a second horizontal platform support having a first end with a first opening located opposite a second end having a second opening, the first opening of the first end of the second horizontal platform support is configured to receive a pin of the at least one pin of the second connector, the second horizontal platform support having at least one step, the at least one step is configured to retain at least a portion of the second plate, the second horizontal platform support having a track; and a removable panel, the removable panel having a protruding structure configured to slidable traverse the track of the vertical column of the support structure, whereby at least a portion of an edge of the removable panel is retained in the track of the second horizontal platform support.

Clause 2. The configurable labyrinth for an animal of clause 1 wherein the vertical column having a radiused guide structure, the radiused guide structure is located on an end portion of the track, the radiused guide structure is splayed, the radiused guide structure is configured to guide the protruding structure of the removable panel into the track of the vertical column during installation.

Clause 3. The configurable labyrinth for an animal of clause 2 wherein the end portion of the radiused guide structure is notched, whereby, the end portion of the radiused guide structure does not contact the vertical column.

Clause 4. The configurable labyrinth for an animal of clause 1 wherein the removable panel having at least one opening.

Clause 5. The configurable labyrinth for an animal of clause 1 wherein the removable panel having a hingedly pivotable door.

Clause 6. A configurable labyrinth for an animal, comprising: a first plate; a second plate; a support structure comprising: a vertical column, the vertical column having a first end having a first opening located opposite a second end having a second opening, the vertical column having a track; a first connector, the first connector is configured to connect to the first end of the vertical column; a second connector, the second connector is configured to connect to the second end of the vertical column; a first horizontal platform support is configured to connect to the first connector, the first horizontal platform support is configured to retain at least a portion of the first plate; and a second horizontal platform support is configured to connect to the second connector, the second horizontal platform support is configured to retain at least a portion of the second plate, the second horizontal platform support having a track; and a removable panel, the removable panel is configured to slidable traverse the track of the vertical column of the support structure, whereby at least a portion of an edge of the removable panel is retained in the track of the second horizontal platform support.

Clause 7. The configurable labyrinth for an animal of clause 6 wherein the vertical column having a radiused guide structure, the radiused guide structure is located on an end portion of the track, the radiused guide structure is splayed, the radiused guide structure is configured to guide a protruding structure of the removable panel into the track of the vertical column during installation.

Clause 8. The configurable labyrinth for an animal of clause 7 wherein the end portion of the radiused guide structure is notched, whereby, the end portion of the radiused guide structure does not contact the vertical column.

Clause 9. The configurable labyrinth for an animal of clause 6 wherein the removable panel having at least one opening.

Clause 10. The configurable labyrinth for an animal of clause 6 wherein the removable panel having a hingedly pivotable door.

Additional Description

Parts may be assembled in a combination of equal-sized horizontal and vertical linked chambers. Floors and ceilings are solid panels when installed. The ceiling panel of a lower chamber is also the floor of the next vertical chamber. Solid side panels move vertically by adding a slot-pin on the vertical edge. When the slot side of the pin is pressed onto the panel and the pin side is inserted into a channel of the vertical column the panel sides in and out of position. Horizontal bottom rails have centered slots that keep the panels in place. Tambor-style side panels could slide vertically by fitting into the vertical column channels or slot-pins could be added to the edges of the tambor panel to allow similar movement.

The corner pins and receiver rails are held together by friction. If testing proves friction is insufficient to keep the pieces locked then alternate or additional connection methods will be developed or purchased after market. Under consideration for development is a pin with clip and release tool. Under consideration for after market purchase is magnets. Bottom and top rails have a slot on the underside for the purpose of mounting a cylinder with twine or any other vertical mounted toy that needs to remain stationary. Additional optional components include: a ramp (nubby material) with pins to hook over top of rail into slot; a hammock that hangs from metal rails that fits in the L-shaped notches which usually support the floor; electronic cat doors could be installed to restrict access to parts of the structure for some pets; a steel plate centered in the floors/ceilings to hang toys with magnets; a feeding station having a bowl support configured to retain a feeding dish; a water station including, but not limited to, a bowls and/or a fountains; a litter box station including, but not limited to, a pull-out drawer, a litter catch pan, and/or a step-out grate; a translucent panel; clear panels including, but not limited to, plexiglass; adjustable panels configured to have differing sized openings for pet access and/or restriction in panels implemented as sliding panels and/or concentric rings.

Catacomb quad stack odd-numbered chamber example: Each layer has 1 open chamber side that enables the pet to enter or exit the structure. Each layer has 3 ceiling/floor panels that enables the pet to ascend or descend between levels.

Catacomb example with one quad-sized chamber and "adding-on" issue if construction method changes as the catacomb grows. A single quad-size chamber with a drop-down face and pull-out tray could be built into a catacomb at a height which allows easy access to a feeding station or litter box maintenance.

Catacomb sample layout for multiple feeding stations, where one cat is overweight or physically larger with a corresponding special diet and another cat(s) is not. The feeding areas can be restricted with reduced sized entryways. In this example the food could be located on pull-out trays at different levels in the catacomb. The heavier or larger cat could be encouraged to get more exercise by putting their feeding station a level requiring more physical energy to reach.

The catacomb could be made of wood to look like furniture. The removable panel may be a tambour wood panel.

Within the catacomb some chambers could be blocked from the maze but open from the front to provide storage cubbyholes, with the maze continuing above and below the inaccessible chambers.

Connector Cube Orientations

Cubes can be on the bottom, middle, or top of each chamber and oriented in all directions. For the purpose of documenting their different structures the following nomenclature is being used: Top Pin—"TP" means there is a pin on the "top" side of the cube. TP cubes have notches to support ceiling platform. TP cubes have no slots. Top+Bottom Pins—"TBP" means there are pins on the "top" side and the "bottom" side of the cube. TBP cubes have notches to support ceiling or floor platforms. TBP cubes have slots where the side panels rest when lowered. Bottom Pin—"BP" means there is a pin on the "bottom" side of the cube. BP cubes have notches to support floor platform. BP cubes have slots where the side panels rest when lowered.

BRIEF DESCRIPTION OF THE DRAWINGS

To more fully understand the invention, reference is made to the accompanying drawings or figures. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one aspect," "an aspect," "certain aspects," "various aspects," or similar language means that a particular aspect, feature, structure, or characteristic described in connection with any embodiment is included in at least one embodiment of the invention.

Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting the scope or spirit of the invention as appreciated by those of ordinary skill in the art. The disclosed invention is effectively made or used in any embodiment that includes any novel aspect described herein. All statements herein reciting aspects and embodiments of the invention are intended to encompass both structural and functional equivalents thereof. It is intended that such equivalents include both currently known equivalents and equivalents developed in the future.

Figure 1:
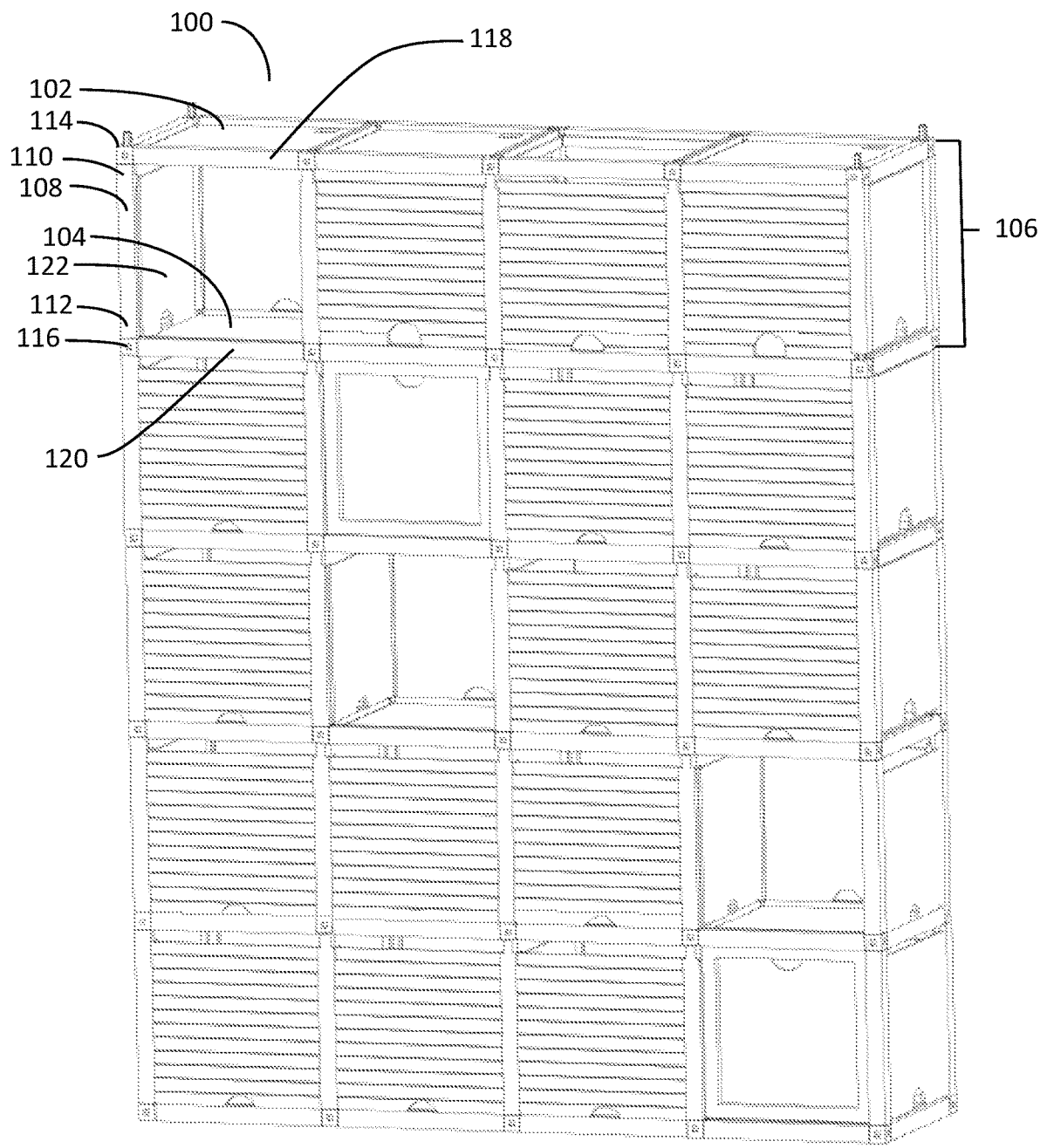
FIG. 1 is an illustration of a perspective view of the novel configurable labyrinth for an animal in accordance with an illustrative embodiment.

Referring to FIG. 1, according to various aspects and embodiments of the invention, shows configurable labyrinth for an animal 100 having first plate 102 being a top ceiling portion and second plate 104 being a bottom floor portion. As a support structure 106 is stacked on top of another support structure, the first plate 102 becomes the second plate 104 of the subsequently stacked support structure. Vertical column 108 has first end 110 located opposite second end 112. First end 110 is connected to first connector 114. Second end 112 is connected to second connector 116. First connector 114 is connected to first horizontal platform support 118. Second connector 116 is connected to second horizontal platform support 120. Removable panel 122 is connected to vertical column 108 and second horizontal platform support 120.

Figure 2:
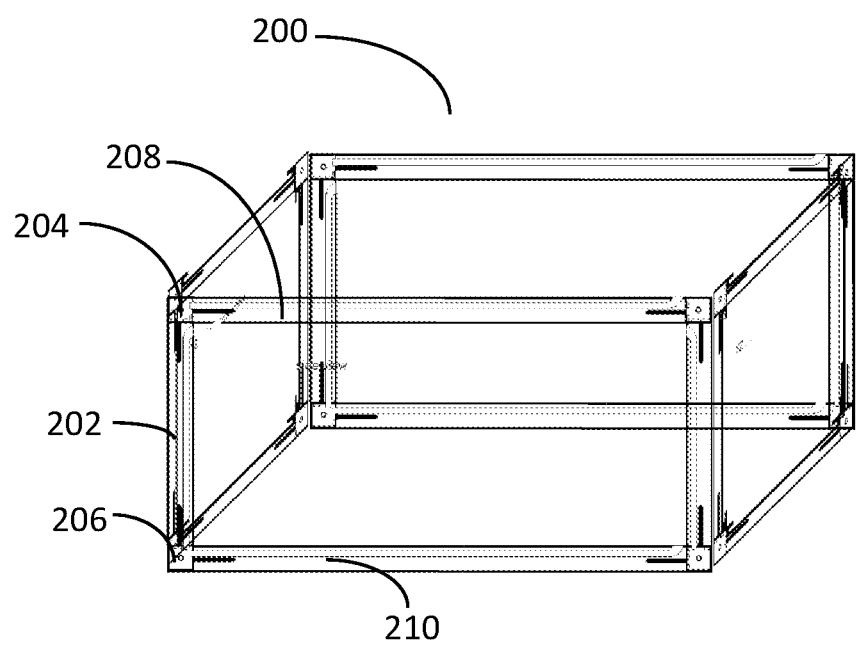
FIG. 2 is an illustration of a perspective view of a support structure in accordance with the embodiment of FIG. 1.

Referring now to FIG. 2, support structure 200 has vertical column 202 connected to first connector 204 and second connector 206. First connector 204 is connected to first horizontal platform support 208. Second connector 206 is connected to second horizontal platform support 210.

Figure 3:
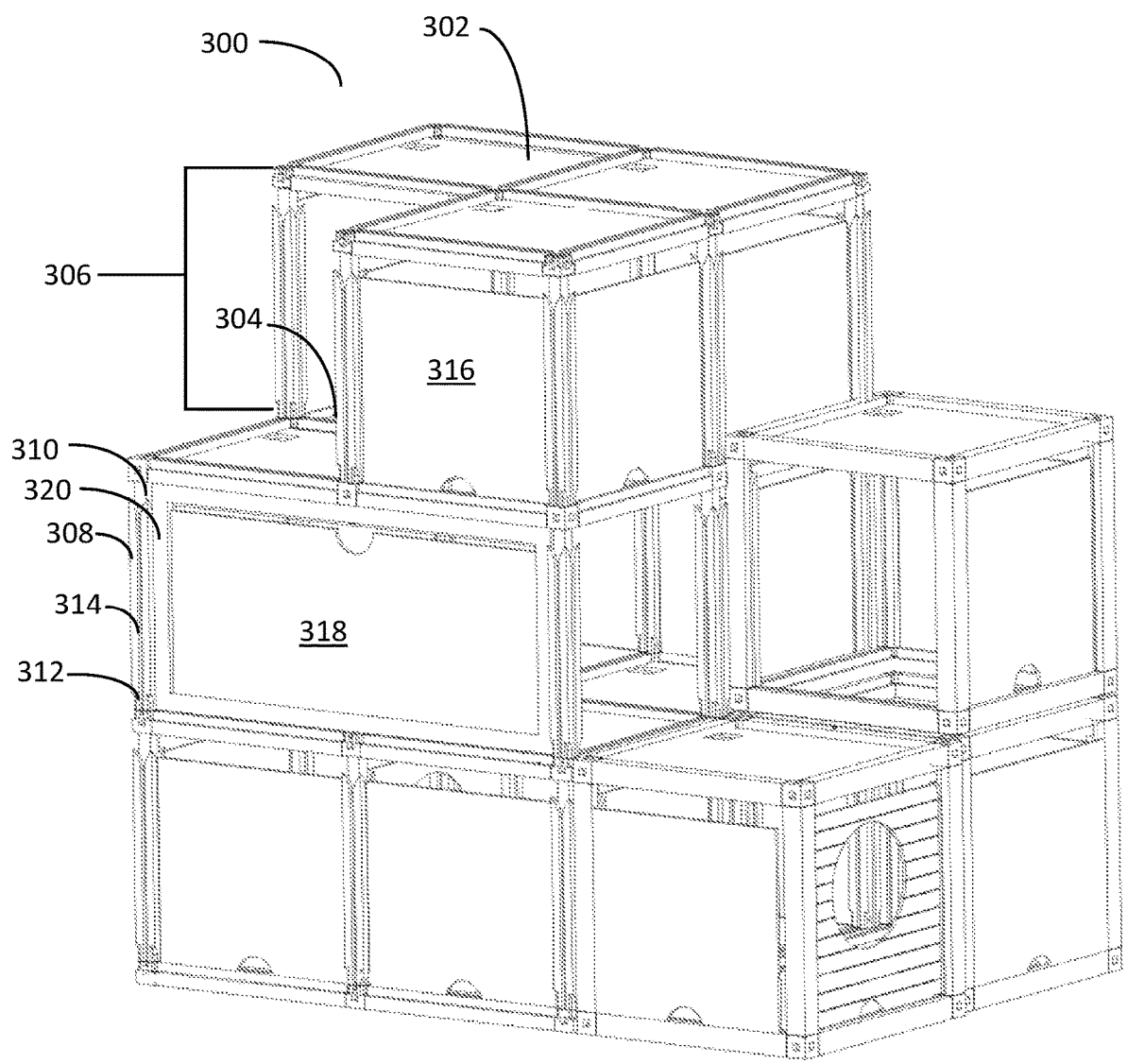
FIG. 3 is an illustration of a perspective view of another embodiment of a configuration of a plurality of support structures of a configurable labyrinth for an animal having a removable panel with a hingedly pivotable door in accordance with an illustrative embodiment.

FIG. 3 illustrates configurable labyrinth for an animal 300 having first plate 302 being a top ceiling portion and second plate 304 being a bottom floor portion. As support structure 306 is stacked on top of another support structure, the first plate 302 becomes the second plate 304 of the subsequently stacked support structure. Vertical column 308 has first end 310 located opposite second end 312. Vertical column 308 has track 314. Removable panel 316 may be retained in vertical column 308. Hingedly pivotable panel 318 may be retained in frame 320. Frame 320 may be retained by vertical column 308.

Figure 4:
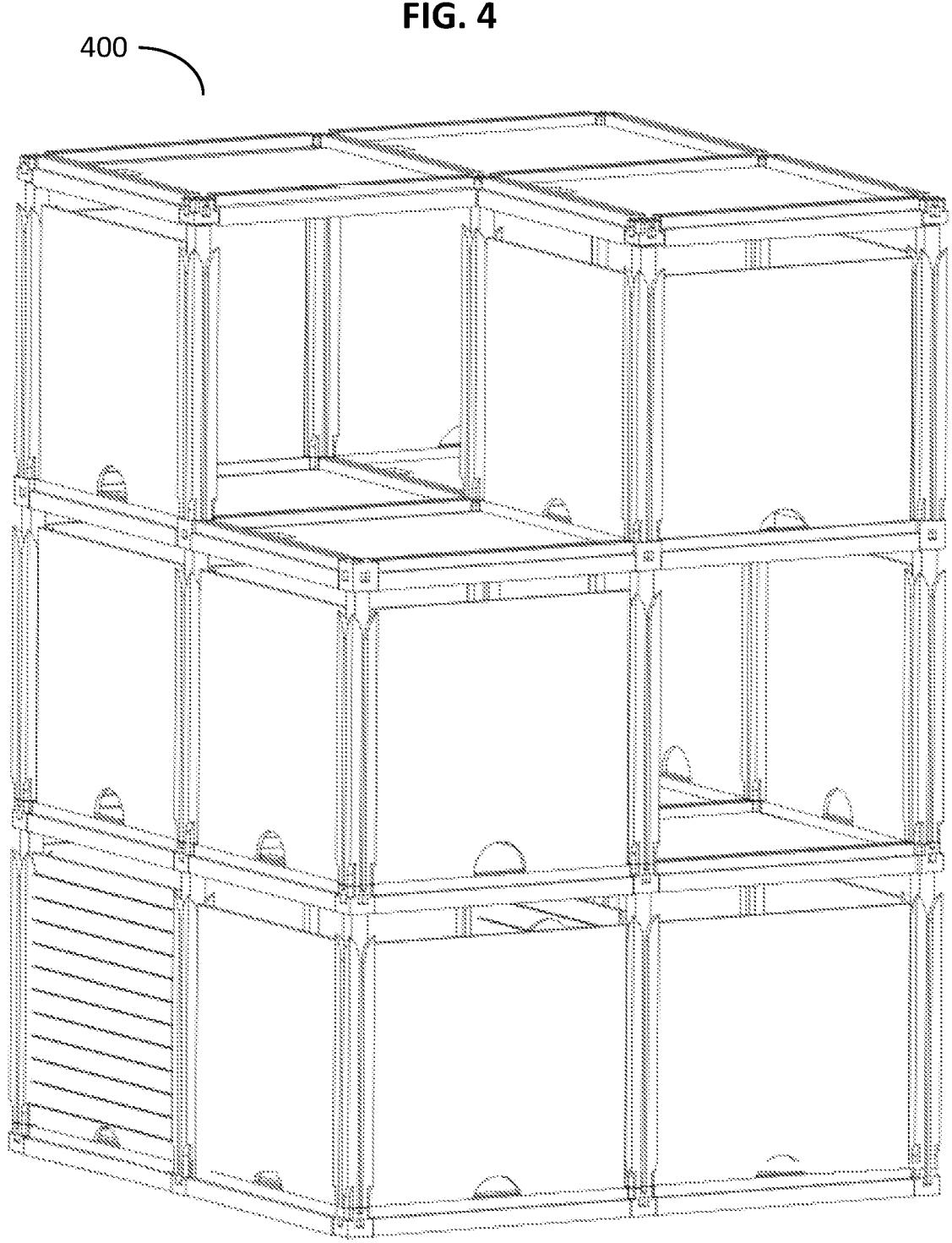
FIG. 4 is an illustration of an exploded view of another embodiment of a configurable labyrinth for an animal in accordance with an illustrative embodiment.

FIG. 4 illustrates configurable labyrinth for an animal 400 having a unique configuration.

Figure 5:
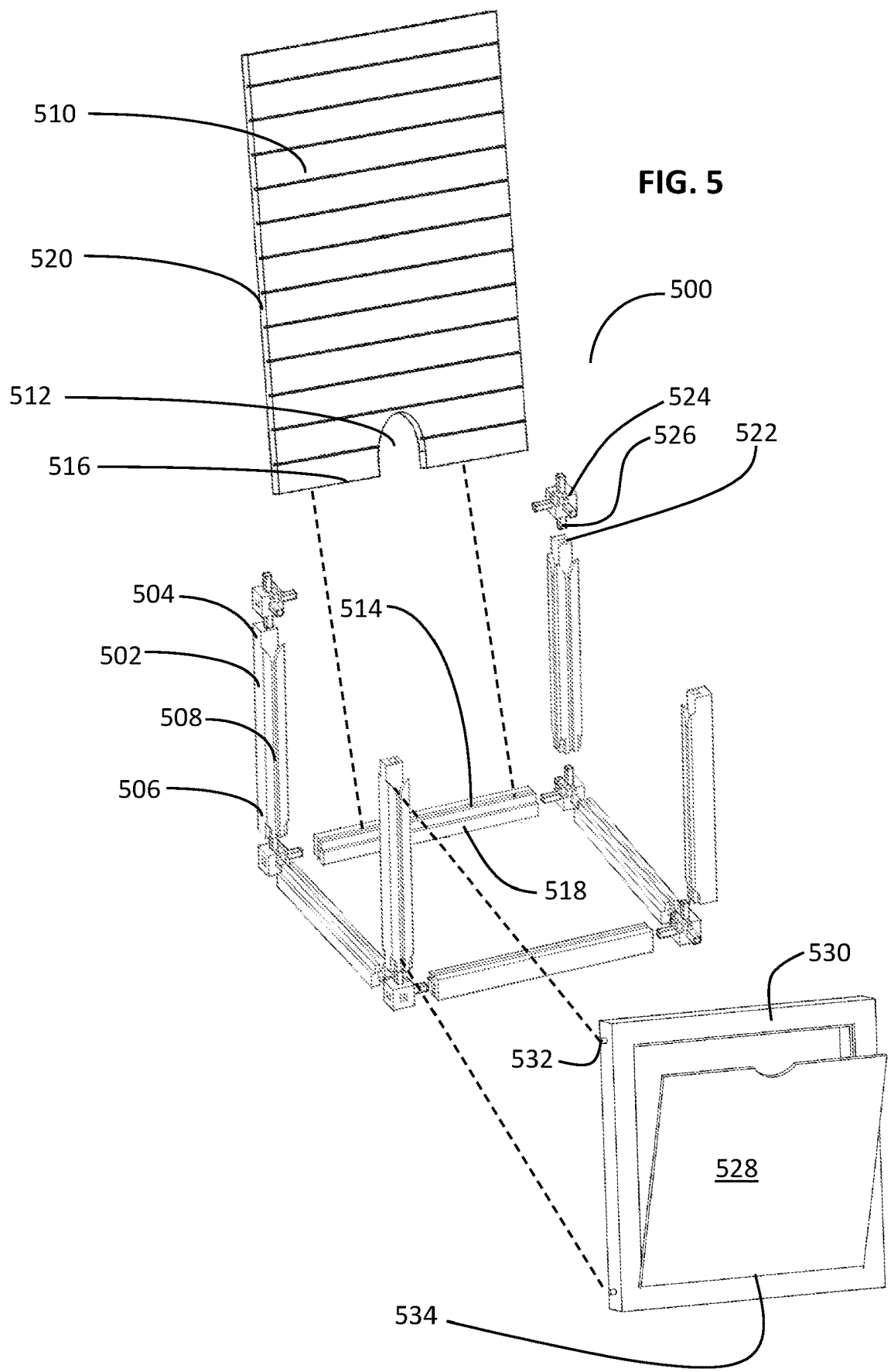
FIG. 5 is an illustration of an exploded view of an embodiment of the support structure in FIGS. 3-4 having a vertical column and a second horizontal platform support with a track configured to receive a removable panel in accordance with an illustrative embodiment.

FIG. 5 illustrates support structure 500. Vertical column 502 has first end 504 located opposite second end 506. First end 504 of vertical column 502 has first opening 522 configured to receive pin 526 of first connector 524. Vertical column 502 has track 508. Removable panel 510 may be made of horizontal wood panels. Removable panel may have at least one opening 512 configured to be a handle to grasp, an air vent, and/or for an animal to traverse through. Depending on the size of the opening and the size of the animal, at least one opening 512 may be any opening including, but not limited to, a radius, a semi-circle, a circle, a square, and/or a rectangle. The lower edge 516 of removable panel 510 is retained in track 514 of second horizontal platform support 518. Side edge 520 of removable panel may be inserted into track 514 of vertical column 502. It is within the scope of this invention for removable panel 510 to have a protruding structure configured to slidably traverse track 514 of vertical column 502. Hingedly pivotable panel 528 may be retained in frame 530. Frame 530 has at least one protruding structure 532 configured to be retained and slidably traverse track 508 of vertical column 502. Hingedly pivotable panel 528 has hinge 534.

Figure 6:
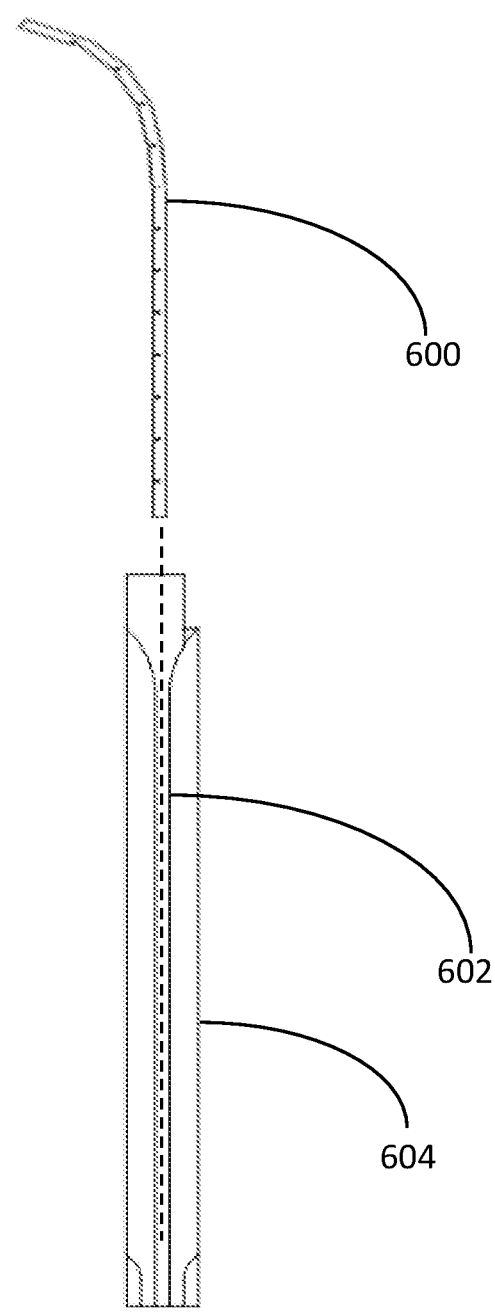
FIG. 6 is an illustration of an exploded view of a tambour slotted panel configured to be installed in a track of a vertical column in accordance with an illustrative embodiment.

FIG. 6 illustrates tambour slotted panel 600 configured to be installed in track 602 of vertical column 604.

Figure 7A:
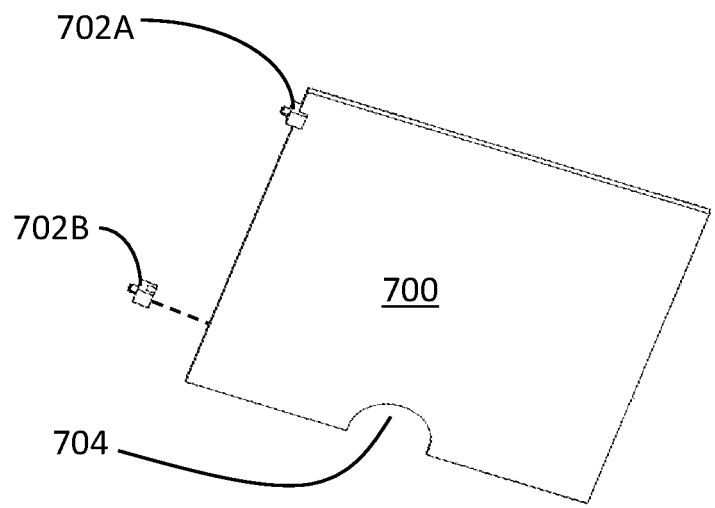
FIG. 7A is an illustration of a perspective view of a panel having the slot pins connected thereto in accordance with an illustrative embodiment.
Figure 7B:
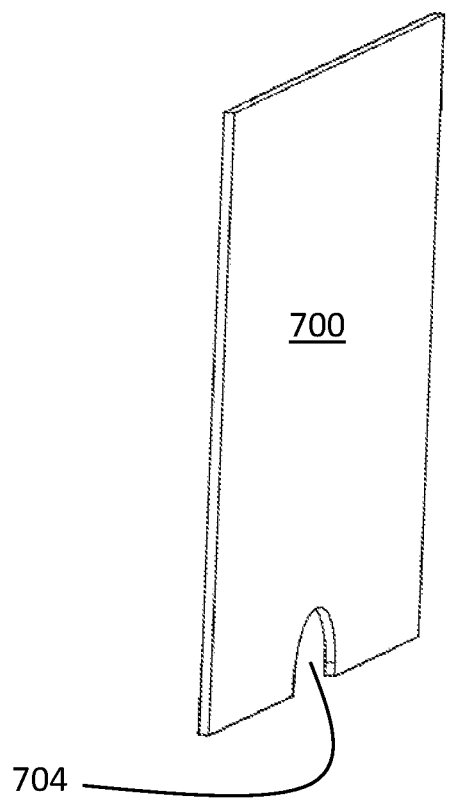
FIG. 7B is an illustration of a perspective view of a panel in accordance with an illustrative embodiment.
Figure 8A:
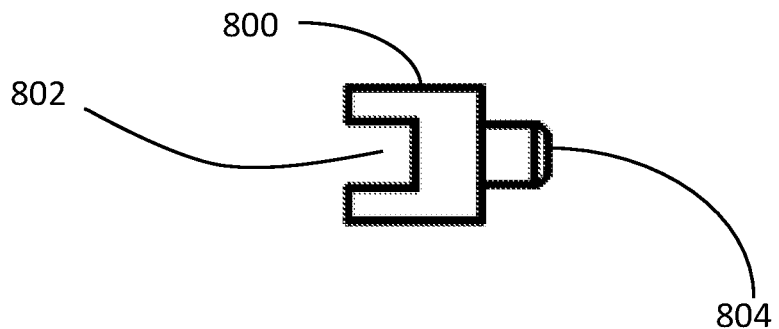
FIG. 8A is an illustration of a side plan view of a slot pin in accordance with an illustrative embodiment.
Figure 8B:
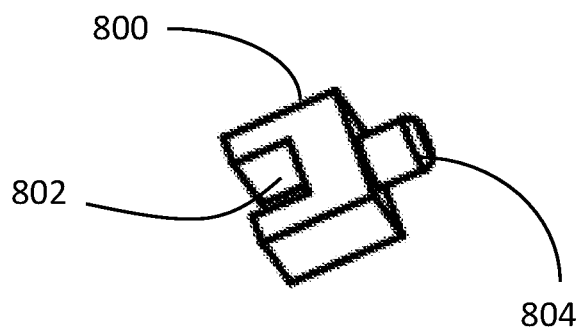
FIG. 8B is an illustration of a perspective view of a slot pin in accordance with an illustrative embodiment.
Figure 8C:
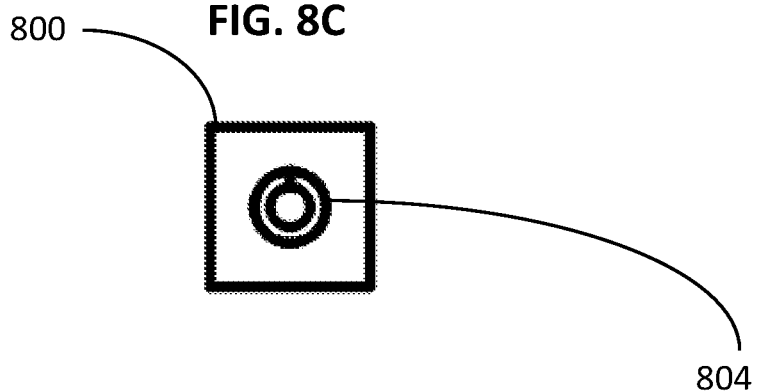
FIG. 8C is an illustration of a top plan view of a slot pin in accordance with an illustrative embodiment.
Figure 8D:
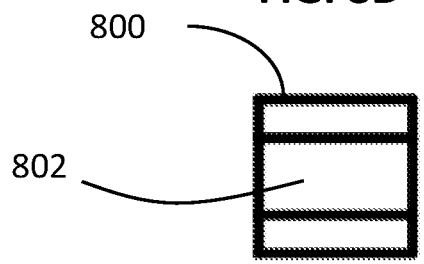
FIG. 8D is an illustration of a rear plan view of a slot pin in accordance with an illustrative embodiment.

FIGS. 7A and 7B illustrate removable panel 700. FIG. 7A shows removable panel 700 having removable slot pin 702A and 702B. It is within the scope of this invention for removable panel 700 to have at least one protruding structure being removable and/or fixedly connected thereto configured to be slidable traverse a track of a vertical column. Removable panel has at least one opening 704.

FIGS. 8A, 8B, 8C, and 8D show removable slot pin 800 having protrusion 804 configured to be inserted into a track of the vertical column and recess 802 (FIGS. 8A, 8B, and 8D) configured to be received by an edge of a removable panel and/or a frame.

Figure 9A:
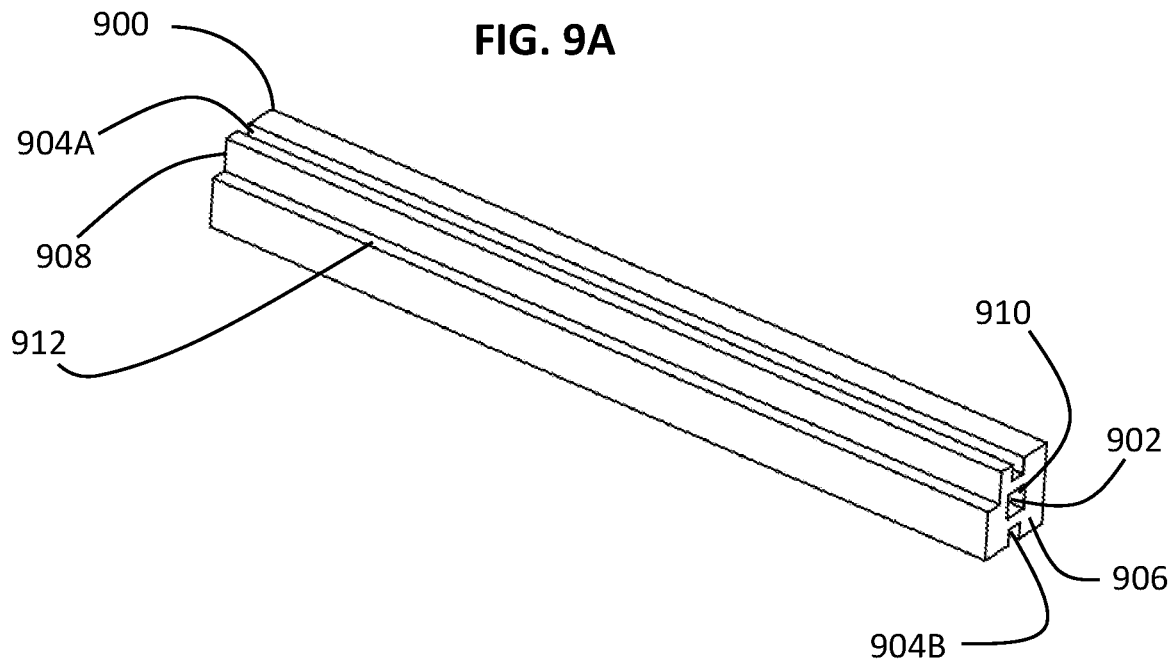
FIG. 9A is an illustration of a perspective view of an embodiment of horizontal platform support configured to be positioned at an outer perimeter edge of the configurable labyrinth for an animal in accordance with an illustrative embodiment.
Figure 9B:
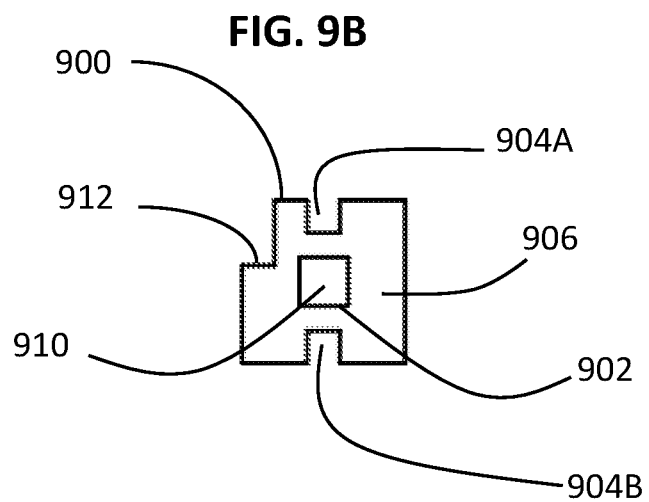
FIG. 9B is an illustration of a right side plan view of an embodiment of horizontal platform support configured to be positioned at an outer perimeter edge of the configurable labyrinth for an animal in accordance with an illustrative embodiment.

FIGS. 9A and 9B illustrate horizontal platform support 900 having first end 906 with first opening 902 located opposite second end 908 having a second opening (not shown). Central bore 910 traverses the length of horizontal platform support 900. It is within the scope of this invention for the horizontal platform support to have an opening, a recess, a bore, a notch, or any other type of latching mechanism configured to receive a pin and/or protrusion from a connector. Further, an end cap may cover these openings to create a more desirable aesthetic. Horizontal platform support 900 has at least one step 912 configured to retain a plate (not shown). Depending on the placement of one support structure in relation to a second support structure and their stacked placement, the type of horizontal platform support may have at least one track or a plurality of tracks. Further, the horizontal platform support may have at least one step and/or a plurality of steps. This embodiment illustrates horizontal platform support 900 having two tracks, first track 904A and second track 904B, and one step.

Figure 10A:
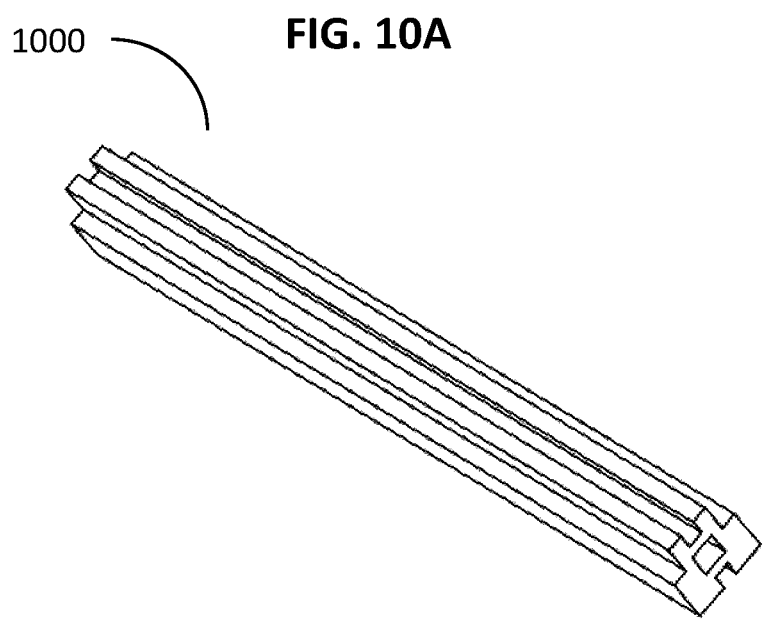
FIG. 10A is an illustration of a perspective view of an embodiment of horizontal platform support configured to be positioned at an inner portion of the configurable labyrinth for an animal in accordance with an illustrative embodiment.
Figure 10B:
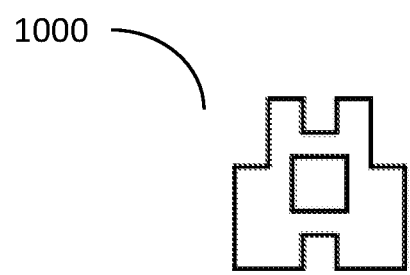
FIG. 10B is an illustration of a side plan view of an embodiment of horizontal platform support configured to be positioned at an inner portion of the configurable labyrinth for an animal in accordance with an illustrative embodiment.

FIGS. 10A and 10B illustrate an embodiment of the horizontal platform support 1000 of FIGS. 9A and 9B having two tracks and two steps.

Figure 11A:
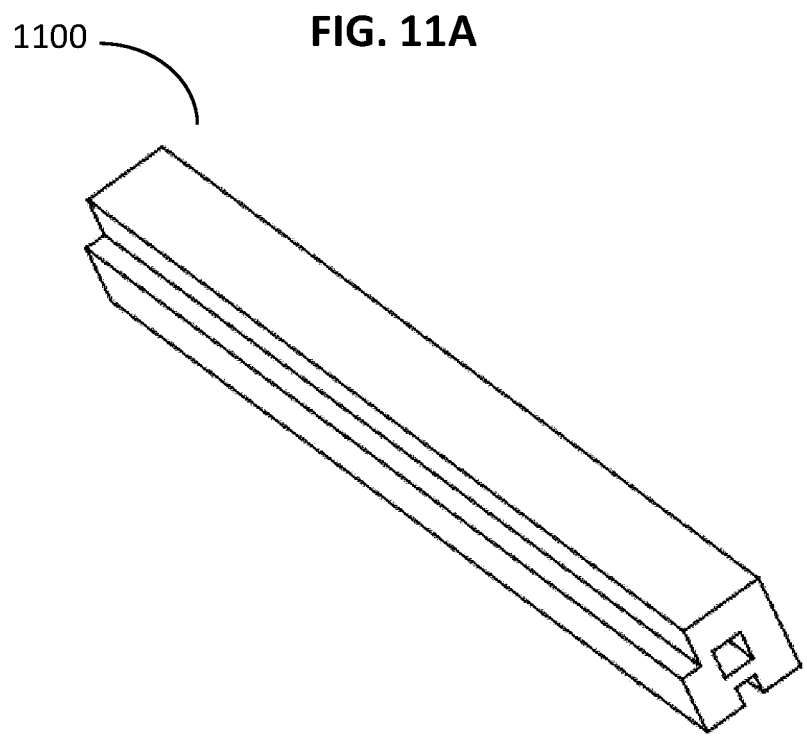
FIG. 11A is an illustration of a perspective view of an embodiment of horizontal platform support configured to be positioned at a top edge portion of the configurable labyrinth for an animal in accordance with an illustrative embodiment.
Figure 11B:
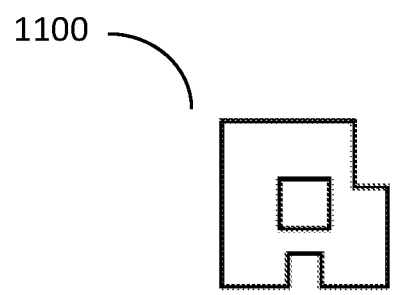
FIG. 11B is an illustration of a left side plan view of an embodiment of horizontal platform support configured to be positioned at a top edge portion of the configurable labyrinth for an animal in accordance with an illustrative embodiment.
Figure 12A:
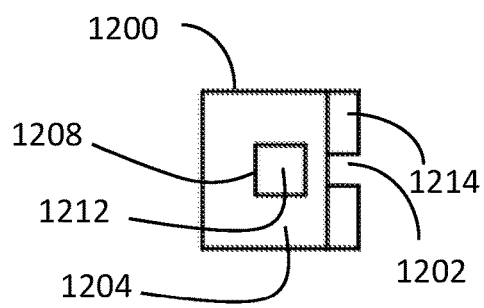
FIG. 12A is an illustration of a top plan view of an embodiment of the vertical column having one track in accordance with an illustrative embodiment.
Figure 12B:
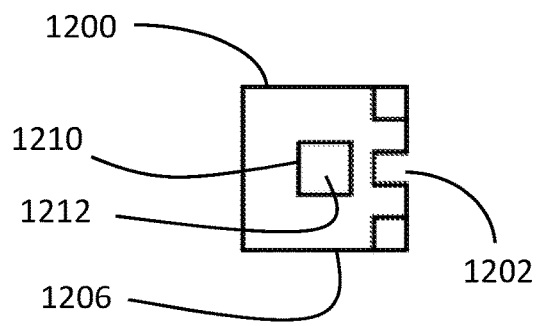
FIG. 12B is an illustration of a rear plan view of an embodiment of the vertical column having one track in accordance with an illustrative embodiment.
Figure 12C:
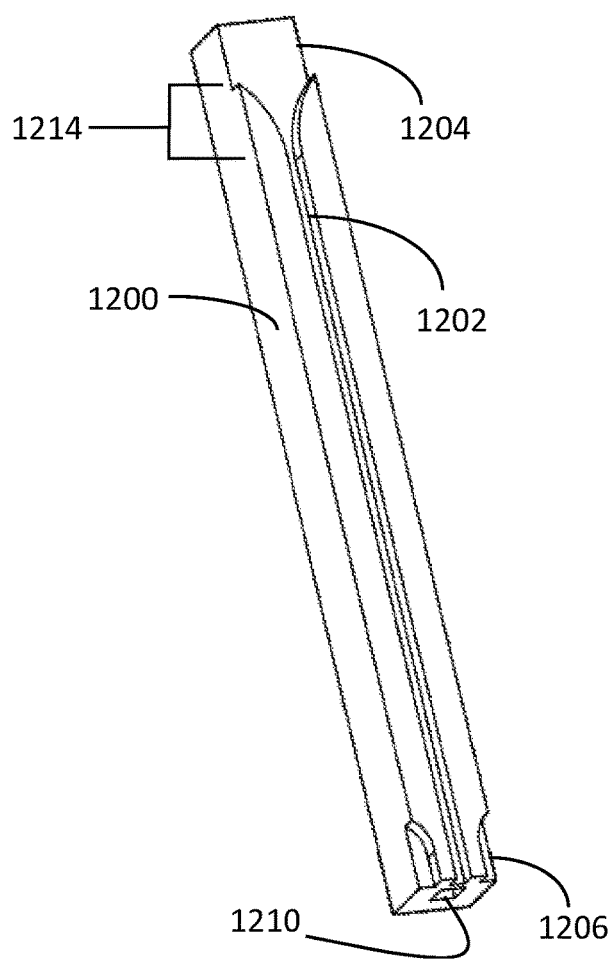
FIG. 12C is an illustration of a perspective view of an embodiment of the vertical column having one track in accordance with an illustrative embodiment.
Figure 12D:
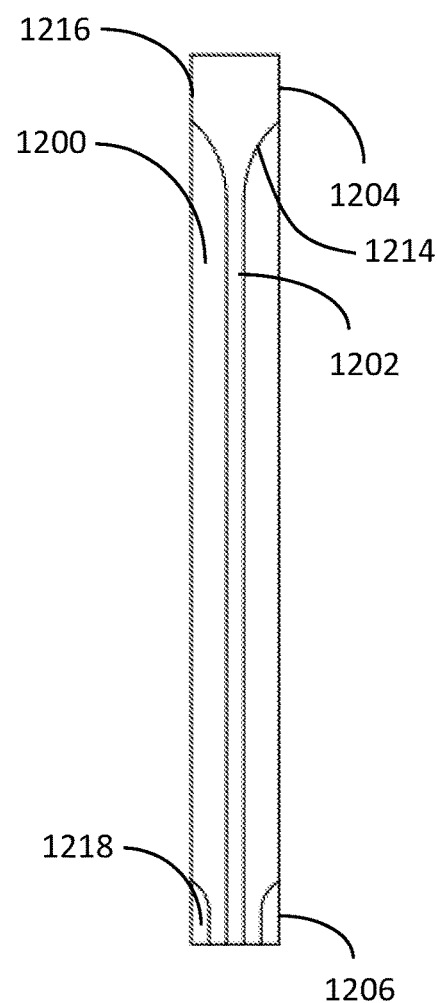
FIG. 12D is an illustration of a front plan view of an embodiment of the vertical column having one track in accordance with an illustrative embodiment.

FIGS. 11A and 11B depict illustrates an embodiment of the horizontal platform support 1100 of FIGS. 9A and 9B having one track and one step.

FIGS. 12A, 12B, 12C, and 12D illustrate an embodiment of vertical column 1200 having one track 1202. Vertical column 1200 has first end 1204 having first opening 1208 located opposite second end 1206 having second opening 1210. Central bore 1212 traverses through the length of vertical column 1200. It is within the scope of this invention for the horizontal platform support to have an opening, a recess, a bore, a notch, or any other type of latching mechanism configured to receive a pin and/or protrusion from a connector. Further, an end cap may cover these openings to create a more desirable aesthetic. Depending on the placement of one support structure in relation to a second support structure and their stacked placement, the type of horizontal platform support may have at least one track or a plurality of tracks. This embodiment illustrates vertical column 1200 having one track. Radiused guide structure 1214 (FIGS. 12A, 12C, and 12D) is located on first end 1204 of track 1202 of vertical column 1200 and is configured to guide a protruding structure, a slot pin, a pin, and/or at least a portion of a panel and/or a frame into track 1202 of vertical column 1200 during installation. It is within the scope of this invention for the track to traverse at least a portion of the vertical column. It is more desirable to leave gap 1216 (FIG. 12D) near first end 1204 to allow room for a removable panel to be received by the guide structure and to facilitate airflow throughout the unit. It is more desirable for vertical column 1200 to have a notched portion 1218 (FIG. 12D) to allow room for a plate to be received by a step in a connector.

Figure 13A:
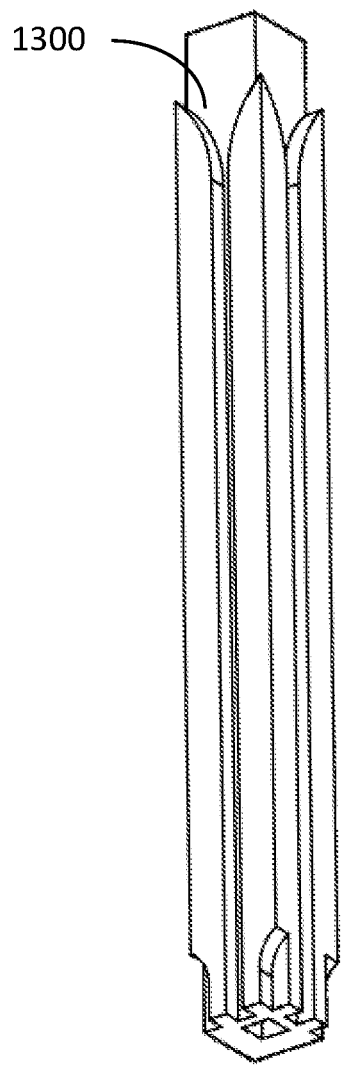
FIG. 13A is an illustration of a perspective view of an embodiment of the vertical column having two tracks in accordance with an illustrative embodiment.
Figure 13B:
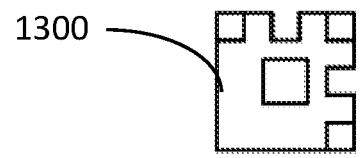
FIG. 13B is an illustration of a rear plan view of an embodiment of the vertical column having two tracks in accordance with an illustrative embodiment.
Figure 13C:
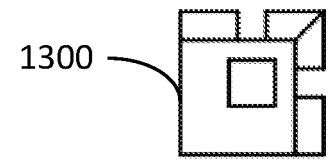
FIG. 13C is an illustration of a top plan view of an embodiment of the vertical column having two tracks in accordance with an illustrative embodiment.

FIGS. 13A, 13B, and 13C illustrate an embodiment of vertical column 1300 of FIGS. 12A, 12B, 12C, and 12D having two tracks.

Figure 14A:
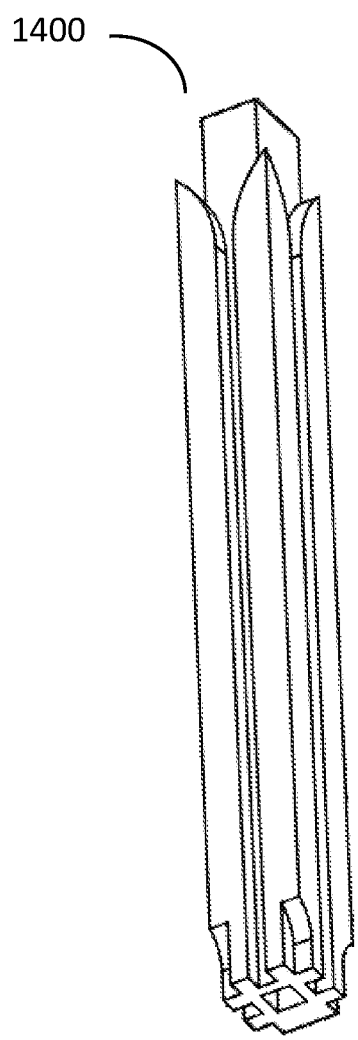
FIG. 14A is an illustration of a perspective view of the vertical column having three tracks in accordance with an illustrative embodiment.
Figure 14B:
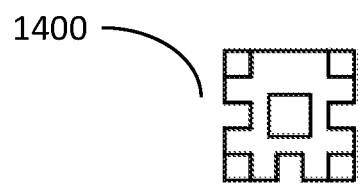
FIG. 14B is an illustration of a rear plan view of the vertical column having three tracks in accordance with an illustrative embodiment.
Figure 14C:
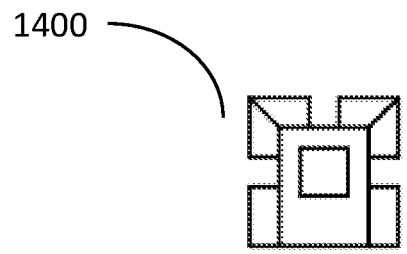
FIG. 14C is an illustration of a top plan view of the vertical column having three tracks in accordance with an illustrative embodiment.

FIGS. 14A, 14B, and 14C illustrate an embodiment of vertical column 1400 of FIGS. 12A, 12B, 12C, and 12D having three tracks.

Figure 15A:
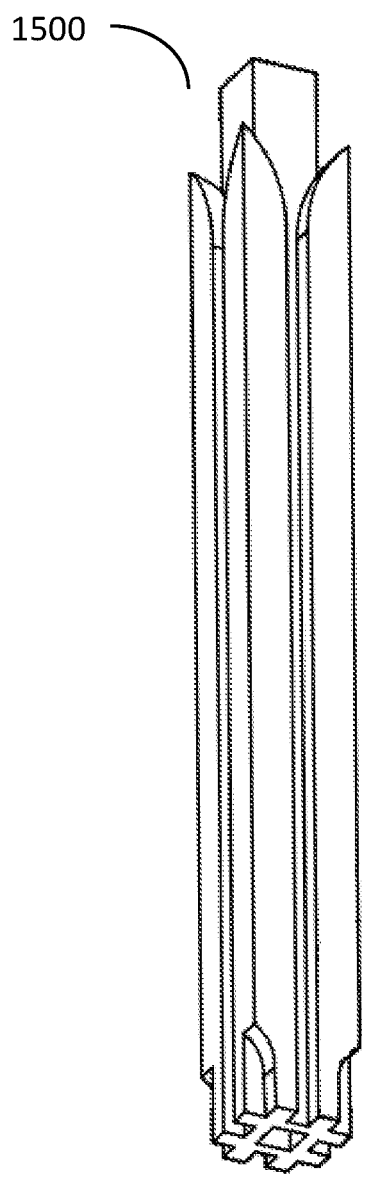
FIG. 15A is an illustration of a perspective view of the vertical column having four tracks in accordance with an illustrative embodiment.
Figure 15B:
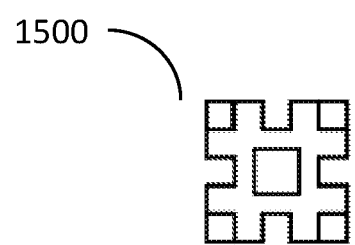
FIG. 15B is an illustration of a rear plan view of the vertical column having four tracks in accordance with an illustrative embodiment.
Figure 15C:
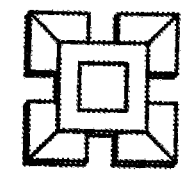
FIG. 15C is an illustration of a top plan view of the vertical column having four tracks in accordance with an illustrative embodiment.

FIGS. 15A, 15B, and 15C illustrate an embodiment of vertical column 1500 of FIGS. 12A, 12B, 12C, and 12D having four tracks.

Figure 16A:
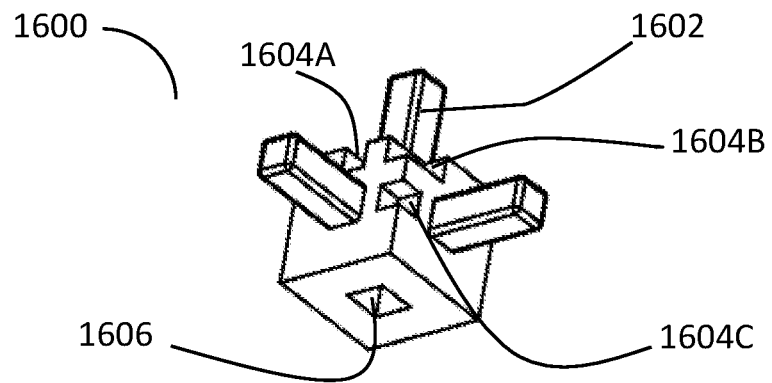
FIG. 16A is an illustration of a rear perspective view of a connector in accordance with an illustrative embodiment.
Figure 16B:
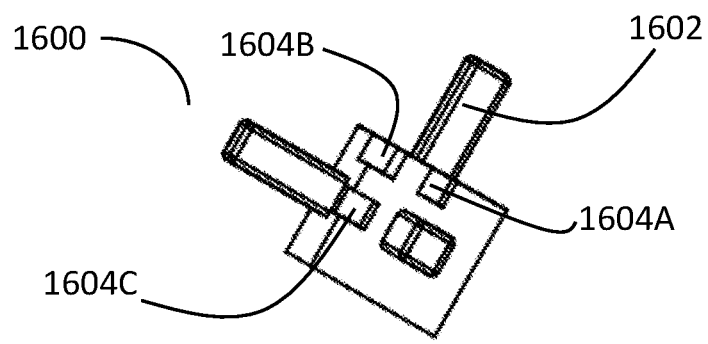
FIG. 16B is an illustration of a perspective view of a connector in accordance with an illustrative embodiment.
Figure 16C:
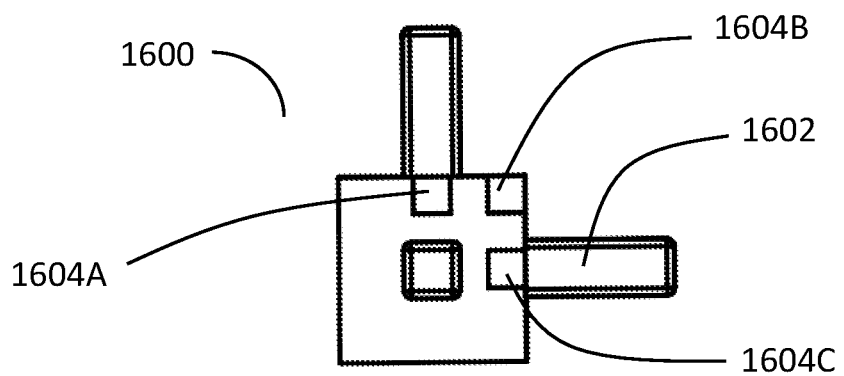
FIG. 16C is an illustration of a side plan view of a connector in accordance with an illustrative embodiment.

FIGS. 16A, 16B and 16C illustrate bottom corner connector cube 1600. Connector cube has at least one pin 1602 extending from a surface of connector cube 1600. Connector cube 1600 has at least one recess 1604A, 1604B, and/or 1604C configured to receive at least a portion of an edge of a panel and/or a plate. In particular, a recess located on a corner edge of a connector is configured to receive a plate for either a ceiling plate and/or a floor plate. A recess located on a non-corner edge of a connector is configured to receive a removable side panel and/or frame having a hingedly pivotable door. Connector cube 1600 has at least one opening 1606 configured to receive a concealing cap, a pin connecting two connectors, a clamp, and/or a pin from another connector. In this embodiment, there is one corner joiner top pin, the cube structure has two slots centered on sides, one cutout on corner between pins to support floor edge, one pin on top, two pins on sides, zero pins on bottom, zero holes on top, two holes on other sides, and one hole on bottom. It is within the scope of this invention for the connector pins and/or protrusions to be magnetic and to magnetically connect to another connector, a vertical column, and/or a horizontal platform support.

Figure 17A:
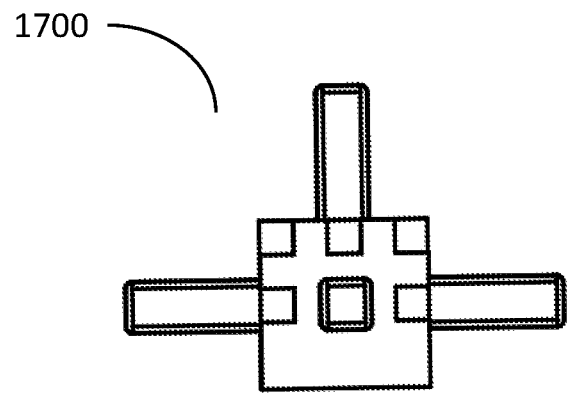
FIG. 17A is an illustration of a front plan view of a connector in accordance with an illustrative embodiment.
Figure 17B:
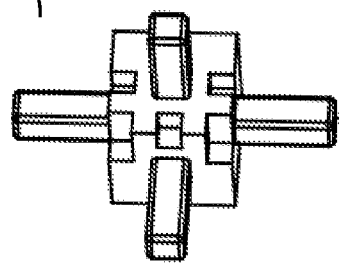
FIG. 17B is an illustration of a top perspective view of a connector in accordance with an illustrative embodiment.
Figure 17C:
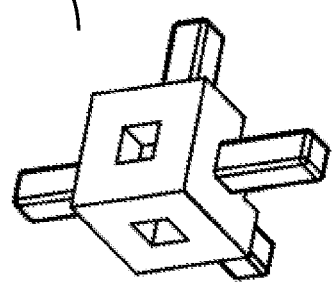
FIG. 17C is an illustration of a rear perspective view of a connector in accordance with an illustrative embodiment.

FIGS. 17A, 17B and 17C illustrate an embodiment of connector 1700 of FIGS. 16A, 16B, and 16C being a bottom edge corner connector cube having a cube structure with three slots centered on sides, two cutouts on corner between pins to support floor edge, one pin on top, three pins on sides, zero pins on bottom, zero holes on top, one hole on sides, and one hole on bottom.

Figure 18A:
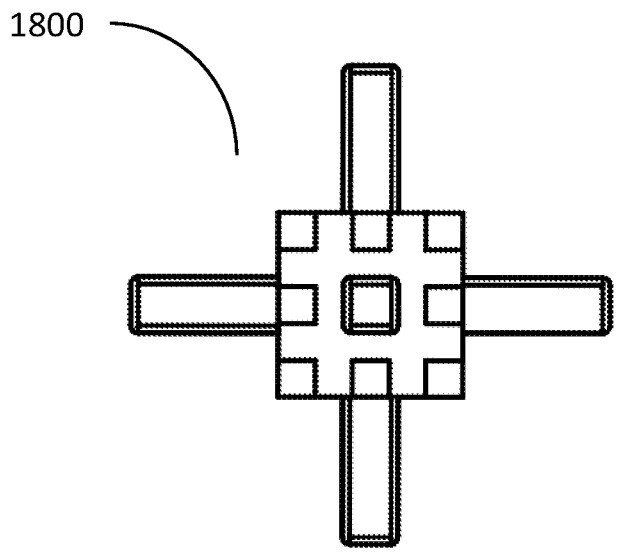
FIG. 18A is an illustration of a front plan view of a connector in accordance with an illustrative embodiment.
Figure 18B:
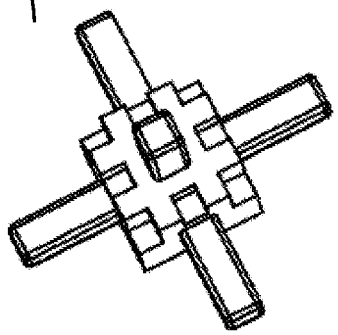
FIG. 18B is an illustration of a top perspective view of a connector in accordance with an illustrative embodiment.
Figure 18C:
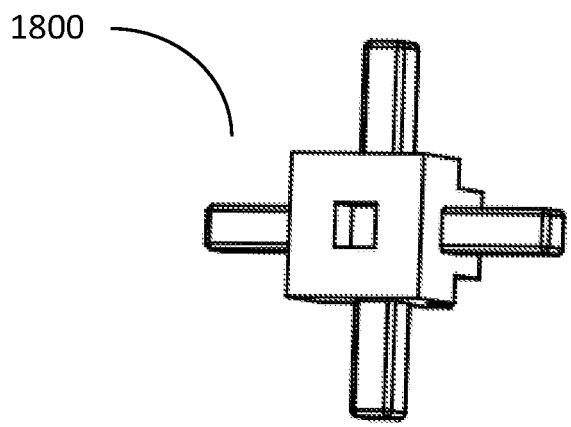
FIG. 18C is an illustration of a rear perspective view of a connector in accordance with an illustrative embodiment.

FIGS. 18A, 18B and 18C illustrate an embodiment of connector 1800 of FIGS. 16A, 16B, and 16C being an edge corner connector cube having a cube structure with four slots centered on sides, four cutouts on corner between pins to support floor edge, one pin on top, four pins on sides, zero pins on bottom, zero holes on top, zero hole on sides, and one hole on bottom.

Figure 19A:
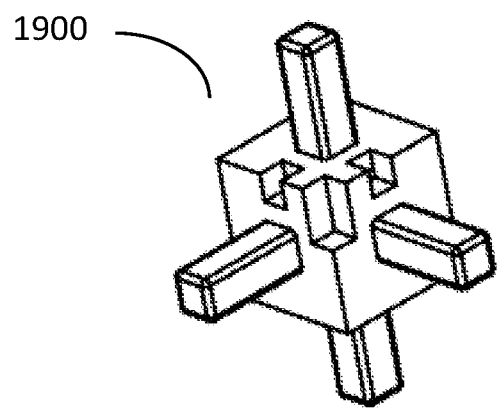
FIG. 19A is an illustration of a top perspective view of a connector in accordance with an illustrative embodiment.
Figure 19B:
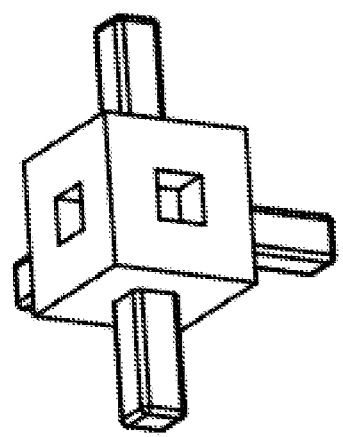
FIG. 19B is an illustration of a rear perspective view of a connector in accordance with an illustrative embodiment.

FIGS. 19A and 19B illustrate an embodiment of connector 1900 of FIGS. 16A, 16B, and 16C being a connector cube having a cube structure with two slots centered on sides, two cutouts on corner between pins to support floor edge, one pin on top, two pins on sides, one pin on bottom, zero holes on top, two hole on sides, and zero holes on bottom.

Figure 20A:
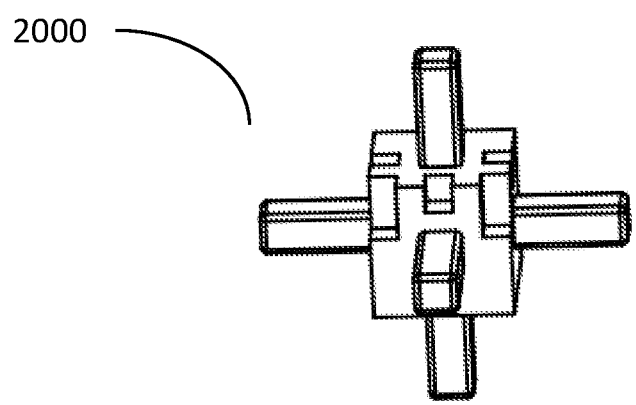
FIG. 20A is an illustration of a top perspective view of a connector in accordance with an illustrative embodiment.
Figure 20B:
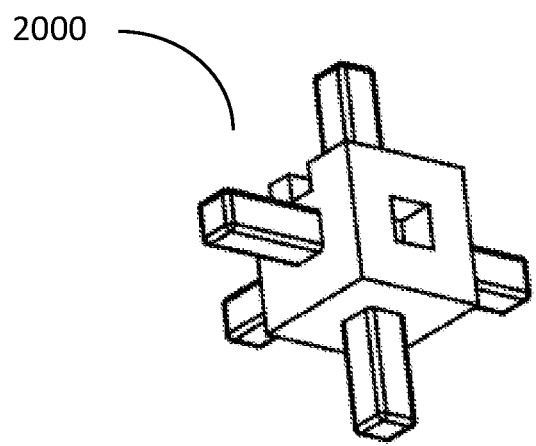
FIG. 20B is an illustration of a rear perspective view of a connector in accordance with an illustrative embodiment.

FIGS. 20A and 20B illustrate an embodiment of connector 2000 of FIGS. 16A, 16B, and 16C being a connector cube having a cube structure with three slots centered on sides, two cutouts on corner between pins to support floor edge, one pin on top, three pins on sides, one pin on bottom, zero holes on top, one hole on side, and zero holes on bottom.

Figure 21A:
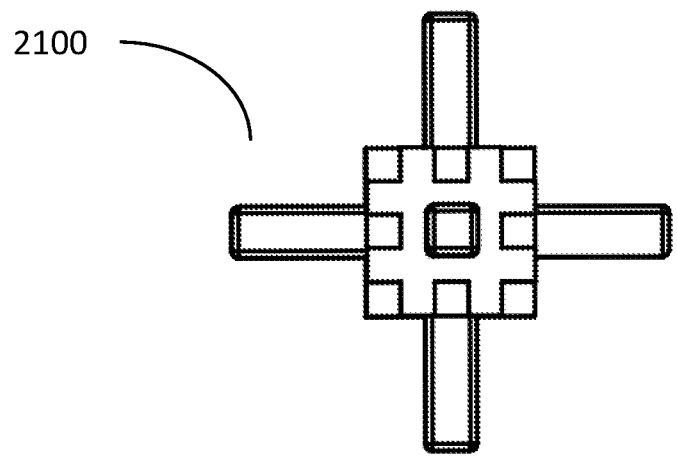
FIG. 21A is an illustration of a side plan view of a connector in accordance with an illustrative embodiment.
Figure 21B:
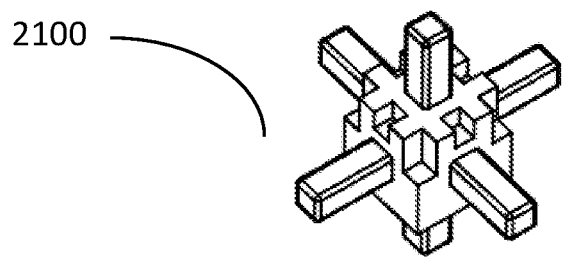
FIG. 21B is an illustration of a top perspective view of a connector in accordance with an illustrative embodiment.
Figure 21C:
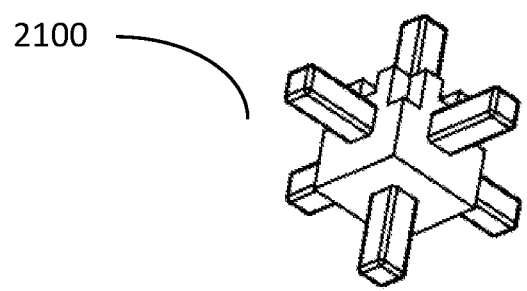
FIG. 21C is an illustration of a rear perspective view of a connector in accordance with an illustrative embodiment.

FIGS. 21A, 21B and 21C illustrate an embodiment of connector 2100 of FIGS. 16A, 16B, and 16C being a connector cube having a cube structure with four slots centered on sides, four cutouts on corner between pins to support floor edge, one pin on top, four pins on sides, one pin on bottom, zero holes on top, zero holes on sides, and zero holes on bottom.

Figure 22A:
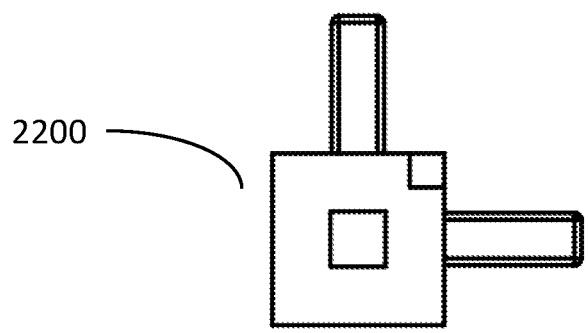
FIG. 22A is an illustration of a side plan view of a connector in accordance with an illustrative embodiment.
Figure 22B:
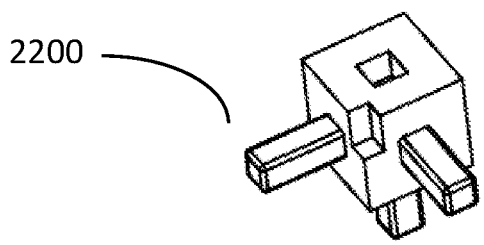
FIG. 22B is an illustration of a top perspective view of a connector in accordance with an illustrative embodiment.
Figure 22C:
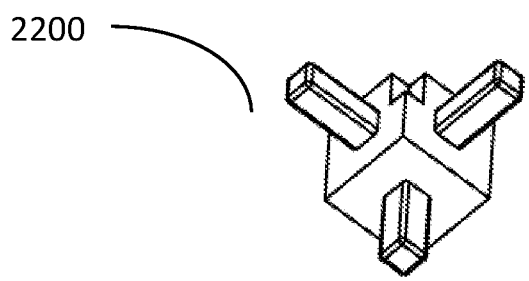
FIG. 22C is an illustration of a rear perspective view of a connector in accordance with an illustrative embodiment.

FIGS. 22A, 22B, and 22C illustrate an embodiment of connector 2200 of FIGS. 16A, 16B, and 16C being a connector cube having a cube structure with zero slots centered on sides, one cutout on corner between pins to support floor edge, zero pins on top, two pins on sides, one pin on bottom, one hole on top, two holes on sides, and zero holes on bottom.

Figure 23A:
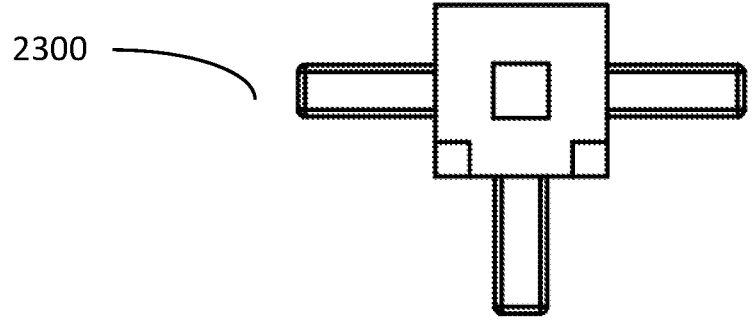
FIG. 23A is an illustration of a side plan view of a connector in accordance with an illustrative embodiment.
Figure 23B:
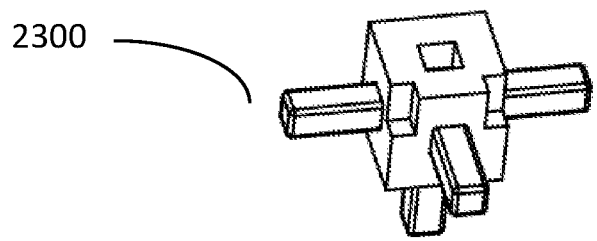
FIG. 23B is an illustration of a top perspective view of a connector in accordance with an illustrative embodiment.
Figure 23C:
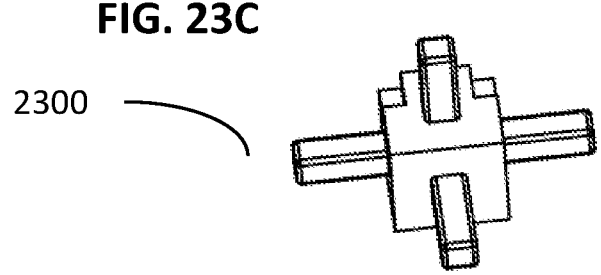
FIG. 23C is an illustration of a rear perspective view of a connector in accordance with an illustrative embodiment.

FIGS. 23A, 23B, and 23C illustrate an embodiment of connector 2300 of FIGS. 16A, 16B, and 16C being a connector cube having a cube structure with zero slots centered on sides, two cutouts on corner between pins to support floor edge, zero pins on top, three pins on sides, one pin on bottom, one hole on top, one hole on sides, and zero holes on bottom.

Figure 24A:
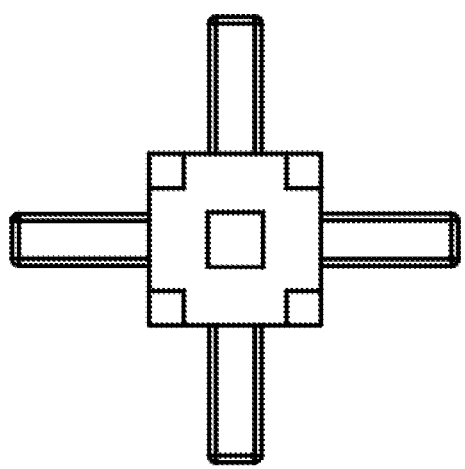
FIG. 24A is an illustration of a side plan view of a connector in accordance with an illustrative embodiment.
Figure 24B:
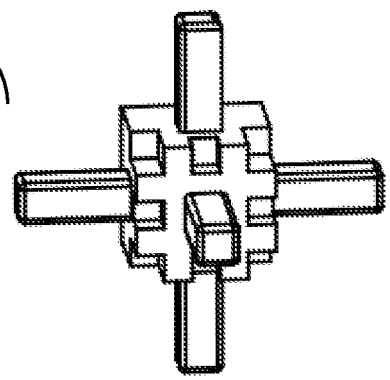
FIG. 24B is an illustration of a top perspective view of a connector in accordance with an illustrative embodiment.

FIGS. 24A and 24B illustrate an embodiment of connector 2400 of FIGS. 16A, 16B, and 16C being a connector cube having a cube structure with zero slots centered on sides, four cutouts on corner between pins to support floor edge, zero pins on top, four pins on sides, one pin on bottom, one hole on top, zero holes on sides, and zero holes on bottom.

To the extent that the terms "including", "includes", "having", "has", "with", or variants thereof are used in either the detailed description and the claims, such terms are intended to be inclusive in a similar manner to the term "comprising."

The described embodiments are illustrative of the invention and are not exhaustive thereof.

The invention accordingly comprises the features of construction, combination of elements, and arrangement of parts that will be exemplified in the description set forth hereinafter and the scope of the invention will be indicated in the claims.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the description is intended to cover all of the generic and specific features of the invention herein described, and all statements of the scope of the invention that, as a matter of language, might be said to fall therebetween.

Now that the invention has been described, the scope of the invention, therefore, is not intended to be limited to the various aspects and embodiments discussed and described herein. Rather, the scope and spirit of invention is embodied by the appended claims.

What is claimed is:

1. A configurable labyrinth for an animal, the labyrinth comprising:
   a plurality of first plates that are removable;
   a plurality of second plates that are removable; and
   a plurality of support structures, where each support structure is stackable on another support structure and each support structure comprising:
      a plurality of vertical columns, each vertical column having a first end having a first opening located opposite a second end having a second opening, each vertical column having a track;
      a plurality of first connectors, each first connector includes a plurality of pins, wherein one pin of the plurality of pins of a selected first connector is inserted into the first opening of a selected vertical column thereby connecting the selected first connector to the first end of the selected vertical column;
      a plurality of second connectors, each second connector includes a plurality of pins, wherein a first pin of the plurality of pins of a selected second connector is inserted into the second opening of a selected vertical column thereby connecting the selected second connector to the second end of the selected vertical column;
      a plurality of first horizontal platform supports, each first horizontal platform support including a first end defining a first opening of a bore and the first opening being located opposite a second end defining a second opening of the bore, wherein a selected first horizontal platform support connects to the selected first connector by inserting a second pin of the plurality of pins of the selected first connector into the first opening of the first end of the selected first horizontal platform support thereby connecting the selected first horizontal platform support to the selected first connector, the selected first horizontal platform support is configured to retain at least a portion of a selected first plate;
      a plurality of second horizontal platform supports, each second horizontal platform support including a first end defining a first support opening of a second bore and the first support opening being located opposite a second end defining a second support opening of the second bore, wherein a selected second horizontal platform support connects to the selected second connector by inserting a second pin of the plurality of pins of the a selected second connector into the first support opening of the first end of the selected second horizontal platform support thereby connecting the selected second horizontal platform support to the selected second connector, the selected second horizontal platform support is configured to retain at least a portion of a selected second plate, the selected second horizontal platform support having a track; and
      a plurality of removable panels, each removable panel is configured to connect to the selected vertical column of the support structure and be removable from a selected support structure,
   wherein the plurality of support structures are connected and stacked to each other using at least one of unused pins of any first connector and unused pins of any second connector to form the labyrinth so that any removable panel can be removed from the labyrinth without disassembling any support structure of the labyrinth.

2. The configurable labyrinth for an animal of claim 1 wherein the vertical column includes a radiused guide structure, the radiused guide structure is located on an end portion of the track, the radiused guide structure is splayed, the radiused guide structure is configured to guide a protruding structure of the removable panel into the track of the vertical column during installation.

3. The configurable labyrinth for an animal of claim 2 wherein the end portion of the radiused guide structure is notched, whereby, the end portion of the radiused guide structure does not contact the vertical column.

4. The configurable labyrinth for an animal of claim 1, wherein at least one removable panel of the plurality of removable panels includes at least one opening.

5. The configurable labyrinth for an animal of claim 4, wherein the at least one opening is a radial opening.

6. The configurable labyrinth for an animal of claim 4, wherein the at least one opening is a circular opening.

7. The configurable labyrinth for an animal of claim 4, wherein the at least one opening is a semi-circular opening.

8. The configurable labyrinth for an animal of claim 4, wherein the at least one opening is a rectangular opening.

9. The configurable labyrinth for an animal of claim 4, wherein the at least one opening is a square opening.

10. A configurable labyrinth for an animal, the configurable labyrinth comprising:
    a plurality of first plates that are removable;
    a plurality of second plates that are removable; and
    a plurality of support structures, each support structure comprising:
       a plurality of vertical columns, each vertical column having a first end having a first opening located opposite a second end having a second opening, each vertical column having a track;
       a plurality of first connectors, each first connector includes a plurality of pins, wherein one pin of the plurality of pins of each first connector is inserted into the first opening of a selected vertical column thereby connecting a selected first connector to the first end of the selected vertical column;
       a plurality of second connector, each second connector includes a plurality of pins, wherein a first pin of the plurality of pins of a selected second connector is inserted into the second opening of the selected vertical column thereby connecting the selected second connector to the second end of the selected vertical column;
       a plurality of first horizontal platform supports, each first horizontal platform support including a first end defining a first opening of a bore and the first opening being located opposite a second end defining a second opening of the bore, wherein a selected first horizontal platform support connects to the selected first connector by inserting a second pin of the plurality of pins of the selected first connector into the first opening of the first end of the selected first horizontal platform support thereby connecting the selected first horizontal platform support to the selected first connector, the selected first horizontal platform support is configured to retain at least a portion of a selected first plate;

a plurality of second horizontal platform supports, each second horizontal platform support including a first end defining a first support opening of a second bore and the first support opening being located opposite a second end defining a second support opening of the second bore, wherein the selected second horizontal platform support connects to the selected first connector by inserting a third pin of the plurality of pins of the selected first connector into the first support opening of the first end of the selected second horizontal platform support thereby connecting the selected second horizontal platform support to the selected first connector, the selected second horizontal platform support is configured to retain at least a portion of a selected second plate, the selected second horizontal platform support having a track; and a plurality of removable panels, each removable panel is configured to connect to any vertical column of a selected support structure and the selected first horizontal platform support, wherein the plurality of support structures are stacked onto each other using at least one of unused pins of any first connector and unused pins of any second connector to form the labyrinth thereby allowing removal of any one or more of the plurality of first plates, of the plurality of second plates, and the plurality of removable panels from the labyrinth without disassembling any support structure, and wherein at least one plate selected from the plurality of second plates of a lower support structure is also an upper plate of an upper support structure.

* * * * *